US012782728B2

(12) United States Patent
Simon et al.

(10) Patent No.: US 12,782,728 B2
(45) Date of Patent: Nov. 3, 2026

(54) OPTICAL GUIDE AND CORRESPONDING MANUFACTURING METHOD

(71) Applicant: OPTINVENT, Rennes (FR)

(72) Inventors: Julien Simon, Rennes (FR); Khaled Sarayeddine, Rennes (FR); Yao Liu, Rennes (FR)

(73) Assignee: OPTINVENT, Rennes (FR)

( * ) Notice: Subject to any disclaimer, the term of this patent is extended or adjusted under 35 U.S.C. 154(b) by 828 days.

(21) Appl. No.: 17/704,633

(22) Filed: Mar. 25, 2022

(65) Prior Publication Data

US 2022/0308279 A1 Sep. 29, 2022

(30) Foreign Application Priority Data

Mar. 29, 2021 (FR) ...................................... 2103209

(51) Int. Cl.
*G02B 27/01* (2006.01)
*F21V 8/00* (2006.01)

(52) U.S. Cl.
CPC ....... *G02B 27/0172* (2013.01); *G02B 6/0036* (2013.01); *G02B 6/0055* (2013.01); *G02B 27/0101* (2013.01); *G02B 2027/0123* (2013.01); *G02B 2027/0132* (2013.01)

(58) Field of Classification Search
CPC ............ G02B 27/0172; G02B 27/0101; G02B 27/0132; G02B 6/0036; G02B 6/0055; G02B 2027/0123; G02B 2027/0132
See application file for complete search history.

(56) References Cited

U.S. PATENT DOCUMENTS

| | | | |
|---|---|---|---|
| 4,220,400 A | 9/1980 | Vizenor | |
| 8,384,999 B1 | 2/2013 | Crosby et al. | |
| 2006/0056185 A1* | 3/2006 | Morino .................... | G02B 3/08 362/337 |
| 2010/0260455 A1 | 10/2010 | Pascal et al. | |

(Continued)

FOREIGN PATENT DOCUMENTS

| | | |
|---|---|---|
| EP | 2791717 B1 | 10/2018 |
| WO | 2009/074638 A2 | 6/2009 |
| WO | 2012/136470 A1 | 10/2012 |

OTHER PUBLICATIONS

Feb. 4, 2022 Search Report issued in French Patent Application No. 2103209.

*Primary Examiner* — Abdulmajeed Aziz
*Assistant Examiner* — Jessica M Apenteng
(74) *Attorney, Agent, or Firm* — Williams Mullen; R. Brian Drozd

(57) ABSTRACT

An optical guide including a first piece made from a transparent material, the first piece including on the surface an array of extraction microstructures composed of a succession of extraction microstructures arranged for projecting to a finite distance an image injected into the optical guide. Each extraction microstructure has a prismatic shape with two faces, one face being called an active surface and having a semi-reflective coating for extracting the image from the optical guide and the other face being called a passive surface and not having any semi-reflective coating. Each active surface is spherical and has an inclination smaller by a mean angle than any active surface immediately preceding in the succession of microstructures in the direction of propagation of the image in the optical guide.

12 Claims, 5 Drawing Sheets

(56) References Cited

U.S. PATENT DOCUMENTS

| | | | | |
|---|---|---|---|---|
| 2012/0002294 | A1 | 1/2012 | Dobschal et al. | |
| 2012/0062991 | A1* | 3/2012 | Krijn | H04N 13/361 359/463 |
| 2016/0282621 | A1* | 9/2016 | Widulle | G02B 5/10 |
| 2016/0313557 | A1 | 10/2016 | Schmidt | |

* cited by examiner

OPTICAL GUIDE AND CORRESPONDING MANUFACTURING METHOD

TECHNICAL FIELD

The present invention relates to the field of the arrangement of microstructures of optical guides serving to extract virtual images injected and transported in these optical guides.

PRIOR ART

An optical guide is formed by a transparent material (plastics material, glass) and serves to transport, by successive internal reflections, light signals constituting a virtual image injected from an injection zone to an extraction zone. Such optical guides are typically used today in augmented reality for projecting, by means adapted spectacles referred to as "informative spectacles", to supply to a user virtual images injected into the optical guide and supplied to the user superimposed on a view of a real scene seen through said spectacles. The injected images are said to be "virtual" in that they do not correspond to the scene seen through the informative spectacles.

The virtual image to be transported is injected into the optical guide by means of a collimation device up against the guide at the injection zone. The collimation device comprises a light source supplying the virtual image. The light source is for example of the LCoS (Liquid Crystal on Silicon), LCD (Liquid Cristal Display), OLED (Organic Light-Emitting Diode), μLED (Micro Light Emitting Diode) or MOEMS (Micro Opto Electro Mechanical System) type. The collimation device further comprises an optical system based on lenses, and optionally mirrors, making it possible to project this virtual image in the form of a collimated beam, which is next introduced into the optical guide through the injection zone.

The extraction zone comprises a set of microstructures constituting an array of semi-reflective reflectors on the surface of the optical guide. These microstructures consist of prisms having an adapted angle, making it possible for the light beam to emerge from the optical guide towards the eye of a user.

A similar arrangement is presented in the patent document WO 2009/074638 A1. In the same principle, FIG. 1 schematically illustrates an arrangement where a set of juxtaposed microstructures form an extraction zone of an optical guide. An optical-guide portion 100 is presented therein, comprising microstructures 101 forming an array of semi-reflective reflectors on the surface of the optical guide. These microstructures 101 are hollow and projecting prisms, and consist of an alternation of surfaces 103 and 102 inclined with respect to the opposite face of the optical guide. The surfaces 103 form conjointly, by means of a semi-reflective coating, the surface for extracting the virtual images injected into the optical guide, i.e. the aforementioned array of reflectors. Active surfaces A are spoken of here. The surfaces 102 form conjointly the transparent surface affording the see-through effect. Passive surfaces B are spoken of here.

Another arrangement making it possible to obtain the see-through effect is presented in the patent document WO 2012/136470 A1. This makes it possible to see the virtual image transported by the light beam superimposed on the scene beyond the optical guide. The see-through vision is in particular allowed by the semi-reflective character of the array of reflectors. This arrangement comprises a first optical-guide piece 100 comprising on the surface microstructures 101 in substance according to the diagram in FIG. 1. The arrangement described introduces a second piece 200 of the optical guide, also referred to as a "cover piece", comprising on the surface microstructures 201 with a shape complementary to the microstructures 101 of said extraction section, as schematically illustrated on FIG. 2. The semi-reflective coating 204 mentioned above appears therein. In addition, a layer of glue 205 extends between the microstructures 101 and 201, so that any microstructure 101 of said extraction section is separated from its complementary microstructure 201 by a transparent medium with a substantially constant thickness.

The microstructures of such optical guides can be manufactured by machining, but are generally manufactured by means of a plastic injection moulding technique, a compression injection moulding technique, hot embossing technique or finally by a technique of thermal forming, or of ultraviolet radiation forming, of monomers. For this purpose, a metal impression (also referred to as an insert) (for example made from steel or aluminium) is manufactured with the negative form of the structure of the optical guide, in order to serve as a mould (after typically the application of a layer of nickel phosphorus for steel impressions). This type of insert must be manufactured with very precise methods to limit surface irregularities to the maximum extent. Some applications involve dimensional tolerances of surface shapes much smaller than the guided wavelength $\lambda$ (for example, less than $\lambda/5$) and also a very low roughness (for example less than 10 nm), in order to have good sharpness of projected virtual image. Thus the semi-reflective surfaces of the microstructures, the role of which is to extract the image towards the eye of a user of the optical guide, must be produced precisely. This is because the virtual image guided in the optical guide by successive total internal reflections is collimated to infinity. Each pixel of the image being transported by a pencil of light rays parallel to each other, the virtual image is therefore guided in the form of parallel light rays.

At the present time, optical guides project the virtual image to infinity. This is because, if the transported virtual image is not collimated to infinity, then various fields making it up pass through the optical guide with a different number of successive internal reflections. Then the fields mingle and the part of the virtual image of the corresponding pixels is scrambled.

Projecting virtual images collimated to infinity satisfies certain applications, but however does not correspond to all user requirements. More particularly, to be able to interact correctly with the content of the projected virtual image (for example at arm's length), it is desirable to project this virtual image to a finite distance on emerging from the optical guide. In addition, in the case of binocular augmented reality spectacles, an image projected to infinity gives rise to a conflict known by the term vergence-accommodation conflict. To avoid such conflict, it is desirable for the right-eye vision and the left-eye vision to converge at a finite distance, referred to as the "convergence distance". This convergence distance is generally less than 2 metres. It is also desirable for the focusing to be done at a short distance to improve the sharpness of the virtual image superimposed on a close-by real scene. This is obviously not possible with a virtual image projected to infinity.

In the prior art, to project the virtual image to a finite distance, typically a short distance of 1 to 10 metres, a negative lens 301 is added to the optical guide 100 and placed at the exit of the extraction zone, and therefore on the same side as the eye of the user 304, to bring the virtual image closer. In addition, a positive lens 302 of the same power is added on the other side of the optical guide 100 with respect to the negative lens 301, and in line with the latter. The positive lens 302 thus compensates for the negative lens 301 so that the vision of the real world through the optical guide is not deformed. The corresponding arrangement is illustrated schematically on FIG. 3. One drawback is that adding these lenses increases the size and weight, and may cause inconvenience for the user.

It is desirable to provide a solution that makes it possible to meet completely or partially the drawbacks of the prior art mentioned above. It is also desirable to provide a solution that is simple to implement at low cost.

DISCLOSURE OF THE INVENTION

One object of the present invention is to propose an optical guide comprising a first piece made from a transparent material, the first comprising on the surface an array of extraction microstructures composed of a succession of extraction microstructures arranged for projecting to a finite distance D a virtual image injected into the optical guide, each extraction microstructure having a prismatic shape with two faces, one face being called an active surface and having a semi-reflective coating for extracting the virtual image from the optical guide and the other face being called a passive surface and not having any semi-reflective coating, characterised in that each active surface is spherical and has an inclination smaller by a mean angle θ than any active surface immediately previous in the succession of microstructures in the direction of propagation of the virtual image in the optical guide. Thus a solution directly integrated in the optical guide is proposed, in a compact manner, without adding lenses. Manufacture is further simplified thereby (limited assembly).

According to a particular embodiment, the optical guide is such that:

$$\theta = \arctan(P/D)/(2*n)$$

and each active surface has a radius of curvature R such that:

$$R = 2*n*D$$

where P is a repetition period of the microstructures of the array of extraction microstructures and n is a refractive index of the transparent material.

According to a particular embodiment, the optical guide further comprises a second piece, referred to as a cover piece, made from the same transparent material as the first piece, the second piece comprising microstructures arranged for fitting in spaces between the microstructures of the first piece, the second piece being glued to the first piece so as to form an optical guide with two parallel faces.

According to a particular embodiment, the second piece has on the surface microstructures with shapes complementary to those of the microstructures of the first piece, with a substantially constant thickness of glue.

According to a particular embodiment, the second piece has on the surface microstructures forming another array of extraction microstructures that comprises another succession of extraction microstructures having active surfaces having a semi-reflective coating and arranged to project the virtual image to a distance D' other than the distance D.

According to a particular embodiment, the distance D' is finite and each active surface of the microstructures of this other array of extraction microstructures is spherical and has an inclination smaller by a mean angle θ' than any active surface immediately preceding in the succession of microstructures in the direction of propagation of the virtual image in the optical guide.

In a variant, the distance D' is infinite.

According to a particular embodiment:

- the semi-reflective coating on the active surfaces of the first piece is sensitive to a specific polarisation and the semi-reflective coating of the active surfaces of the second piece is sensitive to another specific polarisation; or
- the semi-reflective coating on the active surfaces of the first piece is sensitive to a specific wavelength and the semi-reflective coating on the active surfaces of the second piece is sensitive to another specific wavelength; or
- the semi-reflective coating on the active surfaces of the first piece is sensitive to a specific spectral band and the semi-reflective coating on the active surfaces of the second piece is sensitive to another specific spectral band.

According to a particular embodiment, the first piece further comprises on the surface an array of bidimensional pupil-multiplication microstructures placed between an injection zone through which the virtual image to be projected is injected into the optical guide and the array of extraction microstructures, the bidimensional pupil-multiplication microstructures comprising active surfaces in the form of inclined planes having a semi-reflective coating and the other surfaces being passive surfaces not having any semi-reflective coating, the bidimensional pupil-multiplication microstructures being placed obliquely with respect to the extraction microstructures so as to reflect a light ray of the transported virtual image that strikes one or more of its active surfaces towards the array of extraction of microstructures.

According to a particular embodiment, the first piece has a semi-reflective coating between the injection zone and the array of bidimensional pupil-multiplication microstructures, as well as between the array of bidimensional pupil-multiplication microstructures and the array of extraction microstructures.

An image-projection device is also proposed, comprising an optical guide as mentioned above in any one of the embodiments thereof, and a collimation device providing a virtual image collimated to infinity, the collimation device and the optical guide being assembled so that the virtual image supplied by the collimation device is injected into the optical guide and projected to the distance D by the array of extraction microstructures.

An augmented reality system comprising at least one such image-projection device is also proposed.

A method for manufacturing an optical guide is also proposed, comprising the following steps:

- manufacturing a first piece from a transparent material, the first comprising on the surface an array of extraction microstructures composed of a succession of extraction microstructures arranged for projecting to a finite distance D a virtual image injected into the optical guide, each extraction microstructure having a prismatic shape with two faces, one face being called an active surface for extracting the virtual image from the optical guide and the other face being called a passive surface, each active surface being spherical and having an inclination smaller by a mean angle θ than any active surface immediately preceding in the succession of microstructures in the direction of propagation of the virtual image in the optical guide;

applying a semi-reflective treatment to the active surfaces, excluding the passive surfaces.

According to a particular embodiment, the method is such that the first piece further comprises on the surface an array of bidimensional pupil-multiplication microstructures placed between an injection zone through which the virtual image to be projected is injected into the optical guide and the array of extraction microstructures, the bidimensional pupil-multiplication microstructures comprising active surfaces in the form of inclined planes and the other surfaces being passive surfaces, the bidimensional pupil-multiplication microstructures being placed obliquely with respect to the extraction microstructures so as to reflect a light ray of the transported virtual image that strikes one or more of its active surfaces towards the array of extraction microstructures;

and the method further comprises the following step:

applying a semi-reflective treatment to the active surfaces of the bidimensional pupil-multiplication microstructures, excluding the passive surfaces.

According to a particular embodiment, the method further comprises the following steps:

manufacturing a second piece, referred to as a cover piece, from the same transparent material as the first piece, the second piece comprising microstructures arranged for fitting in spaces between the microstructures of the first piece;

gluing the first piece and the second piece together so as to form an optical guide with two parallel faces.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
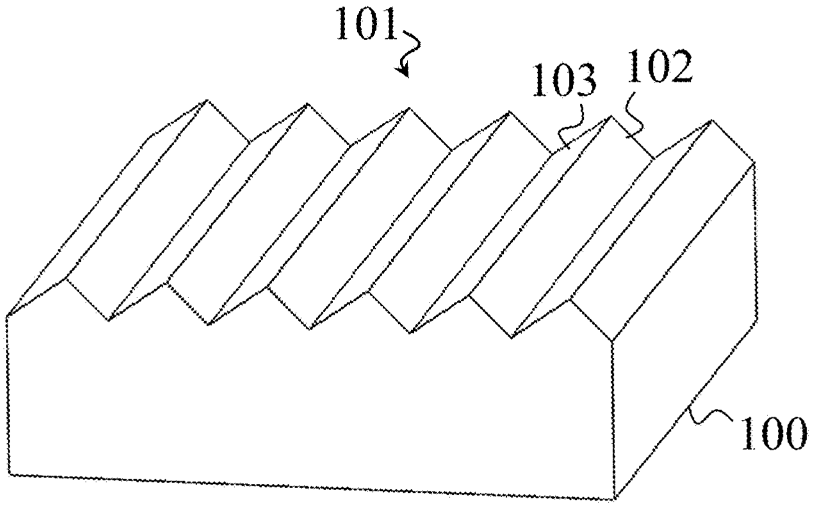
FIG. 1 schematically illustrates extraction microstructures in an extraction zone of an optical guide, according to the prior art.
Figure 2:
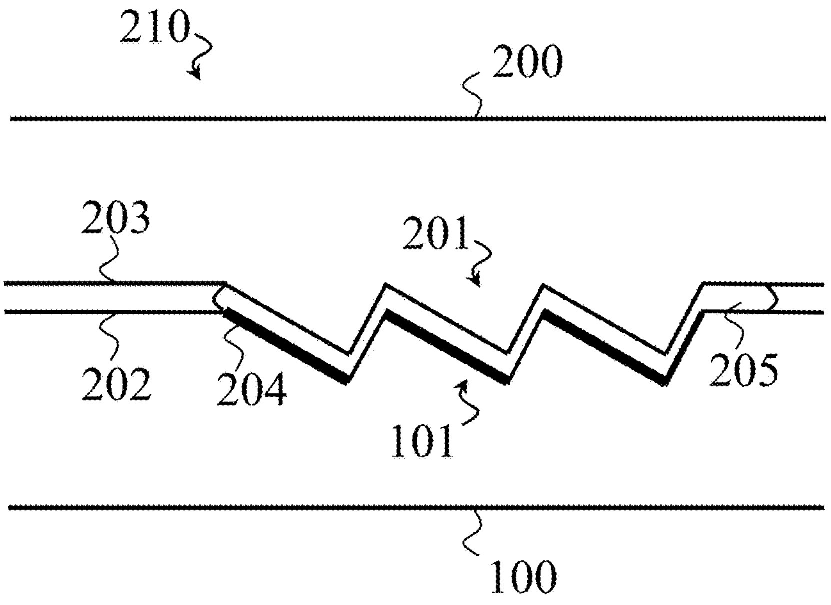
FIG. 2 schematically illustrates another arrangement of an optical-guide extraction zone, according to the prior art.
Figure 3:
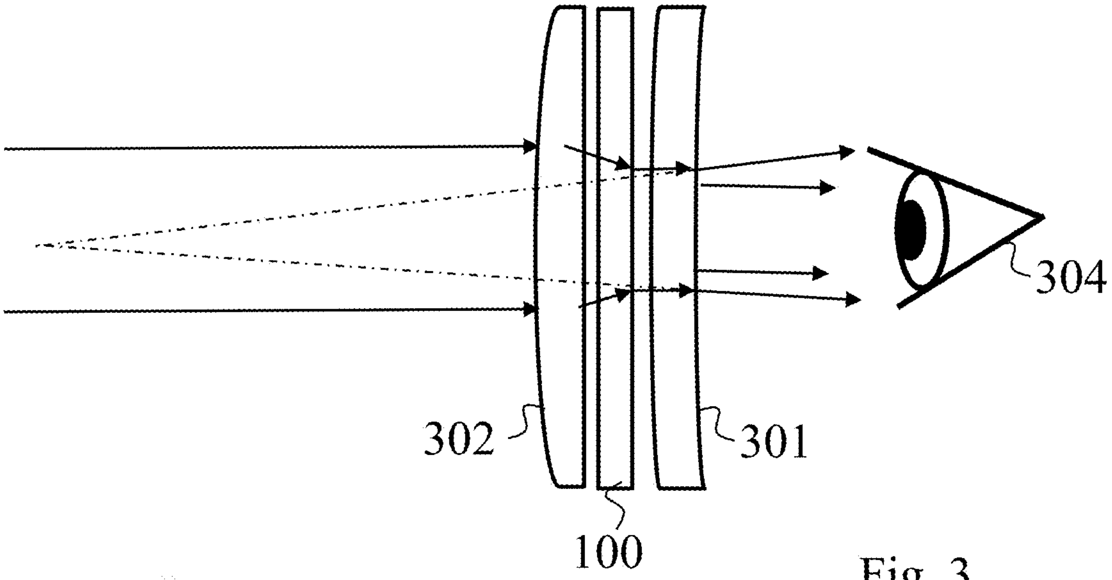
FIG. 3 schematically illustrates an arrangement for the short-distance focusing of an image injected into an optical guide and which is extracted therefrom by means of the microstructures of FIG. 1 or 2, according to the prior art.
Figure 4:
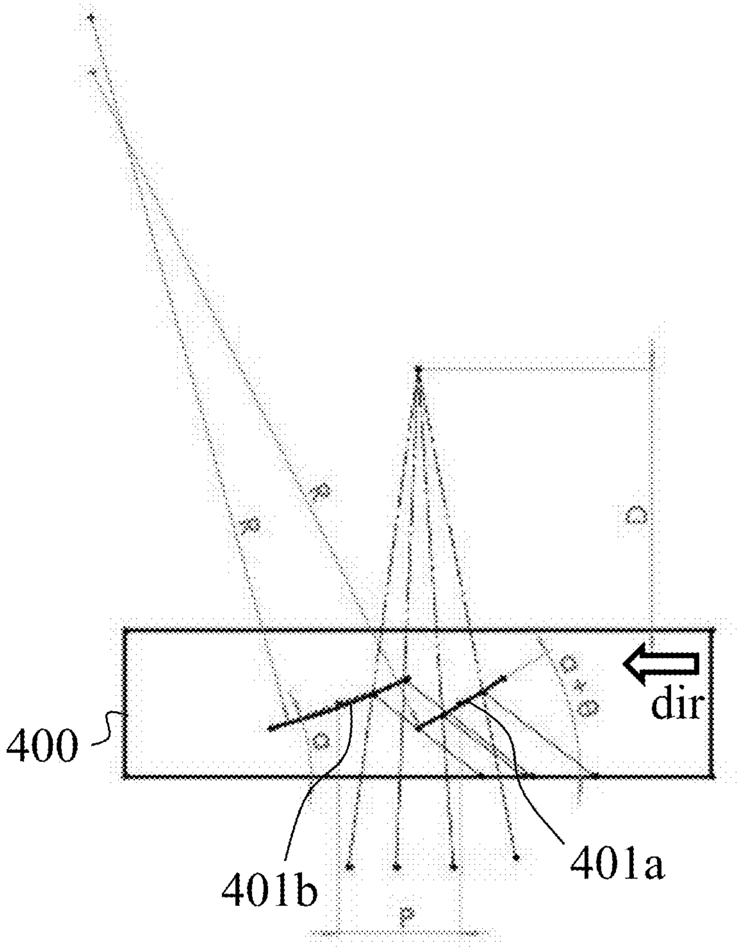
FIG. 4 schematically illustrates, in a simplified cross-sectional view, orientations of active surfaces of optical-guide extraction microstructures, according to the invention.

FIG. 4 schematically illustrates, in simplified cross-sectional view, orientations of active surfaces of extraction-zone microstructures of an optical guide 400, according to the invention. The microstructures of the extraction zone are here called “extraction microstructures”. FIG. 4 shows symbolically the optical guide 400 with a first piece comprising on the surface the extraction microstructures. This first piece is glued to a second piece, also called a “cover piece”, comprising on the surface complementary microstructures, according to the general principle disclosed in the patent document WO 2012/136470 A1. By way of illustration, only two active surfaces of microstructures are shown on FIG. 4.

The optical guide 400 is arranged so that, when a collimation device is associated therewith in accordance with the recommendations for use, the rays of the virtual image, which is supplied by the collimation device and is injected through the injection zone, pass through the optical guide 400 in total internal reflections as far as the extraction zone (from right to left, in accordance with the propagation direction “dir” on FIG. 4). The active surfaces of the extraction microstructures of said first optical-guide piece 400 are spherical semi-reflective surfaces with the same radius of curvature R. The active surfaces of the extraction microstructures of said first optical-guide piece 400 are preferentially concave surfaces, i.e. hollow on the surface of the first piece of the optical guide 400. A projection at a negative distance for compensating for hypermetropia can also be implemented using convex surfaces.

As the rays of the virtual image are collimated to infinity on exiting the collimation device, these rays are therefore all parallel for each field of the transported virtual image. By using a spherical semi-reflective surface 401*a* of radius R inclined in the optical guide 400, part of the image is extracted from the optical guide 400 and is projected at a distance D from the surface of the optical guide 400. Considering another spherical semi-reflective surface 401*b* of radius R inclined in the optical guide 400, another part of the image is extracted from the optical guide and is projected to the distance D from the surface of the optical guide 400. And so on in order to extract the whole of the virtual image and to project it to the distance D from the surface of the optical guide 400 by means of the array of extraction microstructures. The array of extraction microstructures has a repetition period (or pitch) P (one microstructure every period P). The active surfaces of the extraction zone are thus spherical semi-reflective surfaces that are arranged so that the virtual image of a point, or of a pixel, carried by the rays extracted from the optical guide 400 by the semi-reflective surfaces (as symbolically illustrated on FIG. 4) focus in a single point located at the distance D from the surface of the guide. To do this, the inclination of each active surface is smaller by a mean angle $\theta$ than any active surface immediately preceding in the succession of microstructures (in the propagation direction “dir” on FIG. 4). Thus the last microstructure in sequence (in the propagation direction “dir” on FIG. 4) has a profile that forms a mean angle $\alpha$ with the direction of propagation of the image transported in the optical guide 400, the penultimate microstructure in sequence has a profile that forms a mean angle $\alpha+\theta$ with the direction of propagation of the transported image, etc. In other words, considering an array of extraction microstructures having M microstructures, the ith microstructure in sequence in the direction of propagation of the transported image (in the propagation direction “dir” on FIG. 4) has a profile that forms a mean angle $\alpha+(M-i)*\theta$, with $i=1, \ldots, M$, with the direction of propagation of the transported image.

Thus, to project the virtual image to a distance D from the optical guide, the microstructures are arranged so that the following equations are satisfied:

$$R=2*n*D$$

$$\theta=\arctan(P/D)/(2*n)$$

where n is the refractive index of the material constituting the first piece and is equal to that of the second piece of the optical guide 400.

This arrangement enables the virtual image injected into the optical guide 400 to be extracted to a finite distance (represented by D). The arrangement presented serves as a negative lens causing the beam of the extracted virtual image to diverge in order to project this virtual image to a finite distance (represented by D) when it enters the eye, in the manner of an ophthalmic lens (spectacle lens), but advantageously offers a solution integrated in the optical guide (without adding a lens). In this arrangement, only the extracted virtual image is placed at a finite distance, the rays resulting from the see-through effect merely passing through the optical guide 400 and not being diverted by the proposed arrangement.

The angle α is fixed by the optical-guidance conditions, in particular the placing and expected characteristics of the collimation device injecting the virtual image so that the whole of the virtual image is guided by total internal reflections in the optical guide as far as the array of extraction microstructures.

By way of example embodiment, to provide an optical guide that focuses the virtual image extracted to a distance D equal to 2 metres in air, considering that the refractive index n of the material constituting the first piece of the optical guide 400 and of the material constituting the second piece of the optical guide 400 is equal to 1.6, then the radius R is 6.4 metres, and the angle θ is equal to 0.014 degrees, for a repetition period P equal to 1.6 millimetres.

So as to reduce the dimensions of the injection zone, also referred to as the "entry pupil of the optical guide 400", and to reduce accordingly the overall size of the collimation device, the optical guide may include another array of microstructures, referred to as bidimensional pupil-multiplication microstructures. This array of bidimensional pupil-multiplication microstructures is present between the entry pupil and the array of extraction microstructures, i.e. between the injection zone and the extraction zone. The array of bidimensional pupil-multiplication microstructures comprises planar surfaces parallel to each other, arranged to enlarge the beam transporting the virtual image collimated to infinity before extraction to a finite distance by the extraction microstructures. The arrangement is schematically illustrated on FIG. 5, where the injection zone 501 is shown, where the entry beam is injected into a section of this zone that represents the entry pupil of the guide, i.e. the place where all the fields pass through this zone, each with its own angle of incidence.

Figure 5:
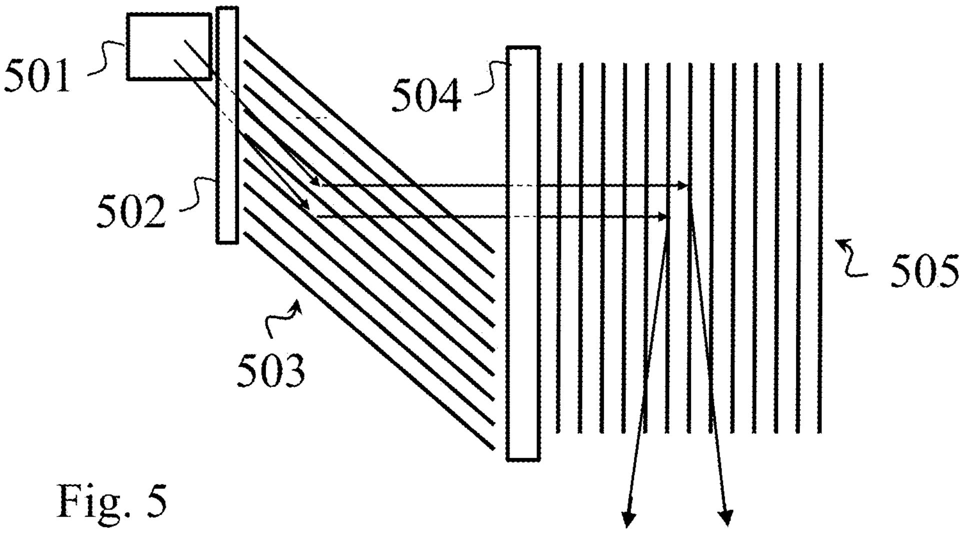
FIG. 5 schematically illustrates an optical guide comprising an array of extraction microstructures supplemented by an array of bidimensional pupil-multiplication microstructures.

The arrangement in FIG. 5 comprises an array of extraction microstructures 505, arranged as previously described in relation to FIG. 4. The microstructures therefore comprise spherical surfaces the coordinated inclinations of which allow an extraction, at a finite distance D from the optical guide, of an image injected into an injection zone 501 of the optical guide.

The arrangement in FIG. 5 further comprises an array of bidimensional pupil-multiplication microstructures 503 for multiplying the size of the image beam with respect to that of the entry pupil. The bidimensional pupil-multiplication microstructures have a prismatic shape with planar surfaces. Each bidimensional pupil-multiplication microstructure comprises an active surface in the form of an inclined plane with semi-reflective coating, and a passive surface without this semi-reflective coating. The bidimensional pupil-multiplication microstructures are arranged obliquely with respect to the extraction microstructures so that the image beam reflected by the active surfaces of the bidimensional pupil-multiplication microstructures is transmitted towards the extraction microstructures. Each ray transporting the virtual image thus strikes one or more active surfaces and is transmitted towards the extraction microstructures.

Between the array of bidimensional pupil-multiplication microstructures 503 and the array of extraction microstructures 505, the optical guide optionally comprises on the surface a deposit of semi-reflective coating 504, having for example a transmission/reflection ratio of 50%. This optional particular arrangement is advantageous when the cover piece is in place. The deposit of semi-reflective coating 504 is then located at the middle of the thickness on the optical guide and makes it possible to duplicate the beam at the entry to the array of extraction microstructures 504.

Between the injection zone 501 and the array of bidimensional pupil-multiplication microstructures 503, the optical guide comprises on the surface a deposit of semi-reflective coating 502, having for example a transmission/reflection ratio of 50%. This optional particular arrangement is advantageous when the cover piece is in place. The deposit of semi-reflective coating 502 is then located at the middle of the thickness of the optical guide and makes it possible to duplicate the beam at the entry to the array of bidimensional pupil-multiplication microstructures 503 and therefore to reduce the dimensions of the collimation device.

Thus, once the virtual image is injected into the optical guide, the fields that make it up (each with a given direction) pass through a zone of the optical guide that comprises the deposit of semi-reflective coating 502. Each incident beam then generates two beams (one is transmitted through the deposit of semi-reflective coating 502 and the other is reflected by this deposit of semi-reflective coating 502). This technique is described in more detail in the patent EP 2791717 B1 and thus makes it possible to fill the optical guide.

The rays transporting the virtual image propagate in the optical guide by total internal reflections and are partially reflected by the array of bidimensional pupil-multiplication microstructures 503. This makes it possible to generate a multitude of reflected beams, each by one or more active surfaces of the array of bidimensional pupil-multiplication microstructures 503, which has the effect of enlarging the cross-section with regard to the entry pupil of the injection zone 501. All the beams may thus not reach the zone of the optical guide that comprises the deposit of semi-reflective coating 504 and are therefore lost (they do not reach the eye box).

The deposit of semi-reflective coating 504 is located at the middle of the thickness of the optical guide, which once again allows a beam duplication. This second beam duplication ensures better field uniformity, by filling zones of the optional guide which otherwise would not be provided with a light beam.

The array of extraction microstructures 505 next allows an extraction towards the outside, by virtue of the reflection on its active surfaces, of the transported virtual image, in order to form a corresponding image in the eye of the user.

Figure 6:
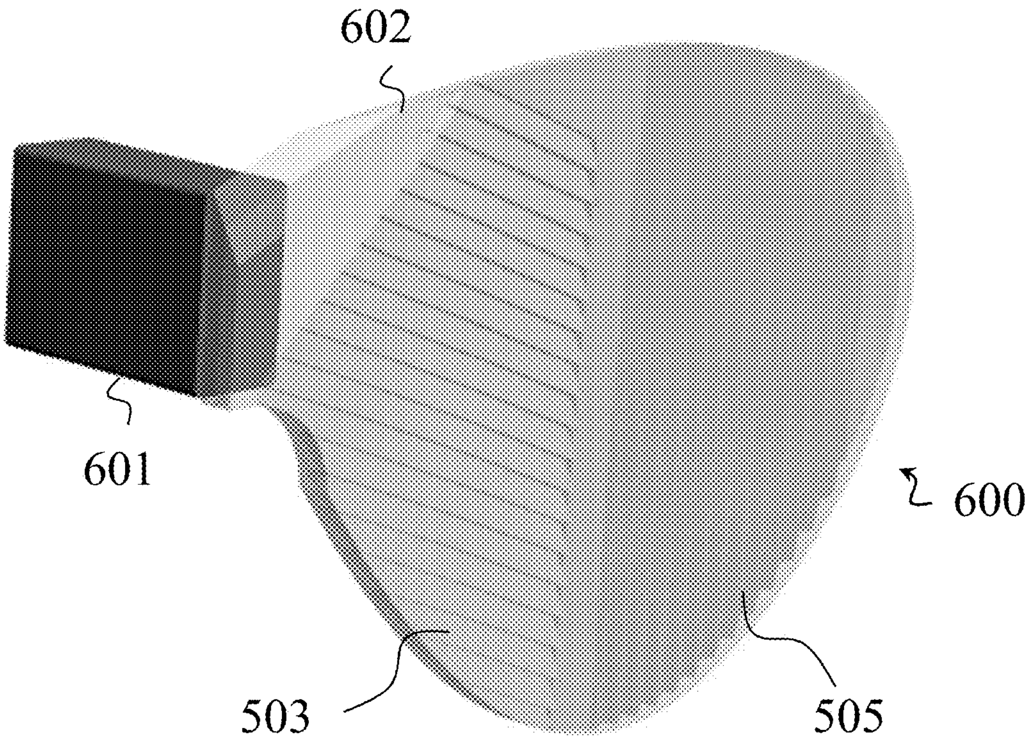
FIG. 6 schematically illustrates an optical guide adapted to informative spectacles.

FIG. 6 illustrates schematically an image projection device 600 adapted to informative (virtual reality) spectacles, comprising an optical guide 602 allowing extraction to a finite distance of an injected image, superimposed with a real scene seen through the optical guide 602. The image projection device 600 makes it possible both to project a virtual image to a finite distance (D) and to offer a see-through effect. The image projection device 600 is easily integrated in an informative-spectacle frame, FIG. 6 schematically illustrating an image projection device 600 adapted for fitting as a right-eye lens (window) of informative spectacles.

The optical guide comprises a first piece made from transparent material, from glass or from plastics material, arranged as presented on FIG. 5. The material used is for example a transparent plastics material with a high refractive index nd (for example, nd>1.6).

In particular, the array of bidimensional pupil-multiplication microstructures 503 and the array of extraction microstructures 505 are present on the surface of this first piece. For example, the array of bidimensional pupil-multiplication microstructures 503 and the array of extraction microstructures 505 are obtained by plastic injection moulding or by machining, using for example a diamond tip.

On the first piece, semi-reflective coatings are present on the active surfaces of the extraction microstructures, as well as between the array of bidimensional pupil-multiplication microstructures 503 and the array of extraction microstructures 505, and between an injection zone where a collimation device 601 is contiguous and the array of bidimensional pupil-multiplication microstructures 503. These coatings make it possible to obtain semi-transparency for the see-through effect.

The beam of the image is formed by the collimation device that is up against the optical guide at its injection zone. The image to be injected is thus collimated to infinity over a total field of 50 degrees, for example. This beam is injected into the optical guide for example through an injection prism, which preferentially forms part of the body of the first piece of the optical guide and forms the injection zone, with an entry pupil for example of 4 mm.

The optical guide comprises a second piece that serves as a cover piece. The second piece is formed from the same transparent material as the first piece (same optical index). The second piece is glued to the first piece, so that the thickness of the optical guide is constant (thickness of the first piece, thickness of the second piece and thickness of glue). After assembly of the first piece and the second piece, the optical guide therefore has two planar external surfaces (faces) parallel to each other. A transparent glue is used, with a refractive index substantially the same as that of the transparent material used for the first piece of the optical guide and of the transparent material used for the second piece of the optical guide.

The microstructures of the second piece are arranged to fit in spaces between the extraction microstructures of the first piece.

The microstructures of the second piece may have shapes complementary to those of microstructures of the first piece, with a substantially constant thickness of glue, as according to the channel principle disclosed in the patent document WO 2012/136470 A1.

When the first piece comprises an array of bidimensional pupil-multiplication microstructures, the second piece comprises microstructures on the surface which, according to the same principle, are geometrically complementary to those of the array of bidimensional pupil-multiplication microstructures of the first piece. This aspect is illustrated schematically on FIG. 7 with the section A-A in simplified view.

In a variant embodiment, the microstructures of the second piece have shapes arranged to allow a second image extraction to a distance D' other than the distance D. As the second piece is glued to the first piece so that the thickness of the optical guide is constant, this means that the thickness of glue is not constant between the extraction microstructures of the first piece and those of the second piece. Making it possible to project one and the same image at different distances (different planes) makes the vision in augmented reality more immersive, closer to that of the human eye, which has the possibility of focusing the image at various distances by adapting its ocular focal length in real time.

Figure 8:
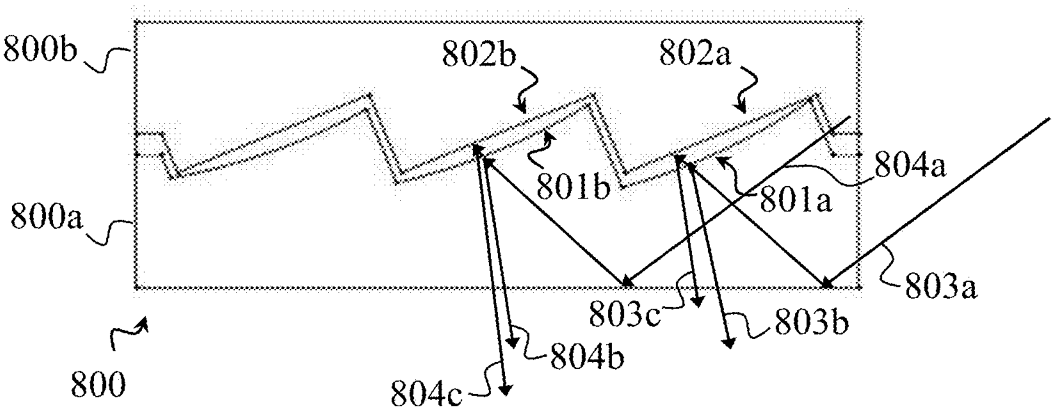
FIG. 8 schematically illustrates an arrangement for extracting images at two different distances.

A corresponding arrangement is illustrated schematically on FIG. 8, where a projection to infinity is achieved by the complementary microstructures of the second piece (cover piece) at the extraction zone.

Thus, in a particular embodiment, the cover piece 800*b* also has an image-extraction function by means of the microstructures that fit in the spaces between the extraction microstructures of the first piece 800*a*. The optical guide 800 thus comprises another succession of extraction microstructures arranged for projecting to a distance D', other than the distance D, the image injected into the optical guide. The active surfaces 802*a*, 802*b* of these microstructures of the cover piece are also spherical and are provided with a semi-reflective coating (not shown). They are placed opposite the active surfaces 801*a*, 801*b* of the extraction microstructures of the first piece 800*a*, but are different from the active surfaces 801*a*, 801*b* opposite which they are placed.

To project the virtual image to a distance D' of the optical guide, the microstructures of the cover piece have a spherical shape and are arranged so that the following equations are satisfied:

$$R'=2*n*D'$$

$$\theta'=\arctan(P/D')/(2*n)$$

where R' is the radius of curvature of the spherical active surfaces 802*a*, 802*b* and θ' represents the difference in inclination of one active surface to the other (according to the same principle as for the extraction microstructures of the first piece 501*a*). The active surfaces of the extraction microstructures of the cover piece are preferentially convex surfaces, i.e. projecting on the surface of the second optical guide piece 400. A projection to a negative distance for compensating for hypermetropia can also be achieved by using concave surfaces.

Thus a light ray 803*a* transported (virtual image) by the optical guide 800 as far as the extraction zone strikes the active surface 801*a*. The semi-reflective treatment of the active surface 801*a* means that a part 803*b* of the light ray 803*a* is reflected and projected out of the optical guide to the distance D. The other part is transmitted via the glue to the active surface 802*a*. The semi-reflective treatment on the active surface 802*a* means that a part 803*c* of the light ray is projected out of the optical guide to the distance D'. Likewise, a light ray 804*a* (virtual image) transported by the optical guide 800 as far as extraction zone strikes the active surface 801*b*. The semi-reflective treatment on the active surface 801*b* means that a part 804*b* of the light ray 804*a* is reflected and projected out of the optical guide to the distance D. The other part is transmitted via the glue to the active surface 802*b*. The semi-reflective treatment on the active surface 802*b* means that a part 803*c* of the light ray is projected out of the optical guide to the distance D'.

The active surfaces of these microstructures of the cover piece can be arranged so as to project the image to an infinite distance, as illustrated on FIG. 8. In other words, there is here no change of angle of inclination from one microstructure to another. The difference in complementarity of shapes of the microstructures placed opposite each other is here also compensated for by the glue so that the external faces of the optical guide remain parallel to each other.

The active surfaces of these microstructures of the cover piece can be arranged so as to project the image to a finite distance.

The active surfaces 801*a*, 801*b* and the active surfaces 802*a*, 802*b* can have different semi-reflective coatings. For example, the treatment applied to the active surfaces of the extraction microstructures of the first piece is selective with respect to specific polarisation (perpendicular or parallel to the plane of incidence) or to a specific wavelength or to a specific spectral band, and the treatment applied to the active surfaces of the extraction microstructures of the first piece is selective with respect to another specific polarisation or to another specific wavelength or to another specific spectral band (respectively). This makes it possible to easily project two distinct images to two different distances, each image then having its own polarisation or wavelength characteristics.

Figure 9:
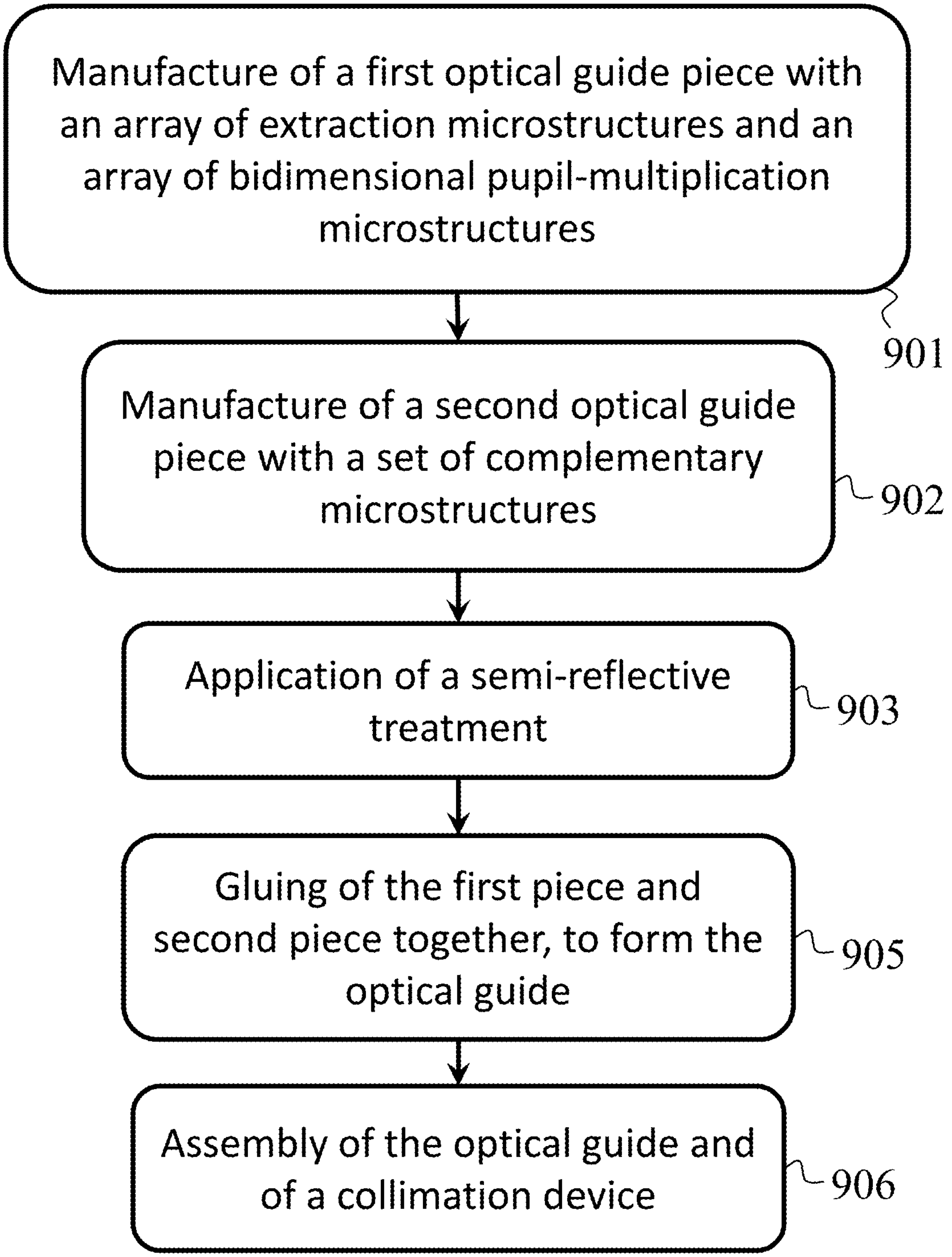
FIG. 9 schematically illustrates a method for manufacturing an optical device.

FIG. 9 illustrates schematically steps of a method for manufacturing an optical guide comprising a first piece and a second piece, as already dealt with above.

In a step 901, the first piece is manufactured for example by machining a block of plastics material or glass or by a plastic injection method or by moulding. The first piece comprises an array of extraction microstructures, as already described in detail. The first piece preferentially comprises an array of bidimensional pupil-multiplication microstructures, as already also described in detail, in particular with regard to FIG. 5.

In a step 902, the second piece is manufactured for example by machining a block of plastics material or glass or by a plastic injection method or by moulding. The second piece comprises microstructures on the surface that are sized and arranged so as then to fit in spaces between the extraction microstructures and between the bidimensional pupil-multiplication microstructures of the first piece.

In a step 903, a semi-reflective treatment (coating) is applied to the active surfaces of the extraction microstructures of the first piece and optionally to those of the second piece when these themselves allow image extraction to the distance D'. The passive surfaces are excluded from this semi-reflective treatment (coating).

A semi-reflective treatment (coating) is preferentially applied between the injection zone through which the collimation device will have to inject the virtual image and the array of bidimensional pupil-multiplication microstructures either on the first piece or on the second piece, so that, after gluing, the treatment is located at the middle of the thickness of the optical guide.

Likewise, a semi-reflective treatment (coating) is preferentially applied between the array of bidimensional pupil-multiplication microstructures and the array of extraction microstructures, either on the first piece or on the second piece, so that, after gluing, the treatment is located at the middle of the thickness of the optical guide.

Figure 7:
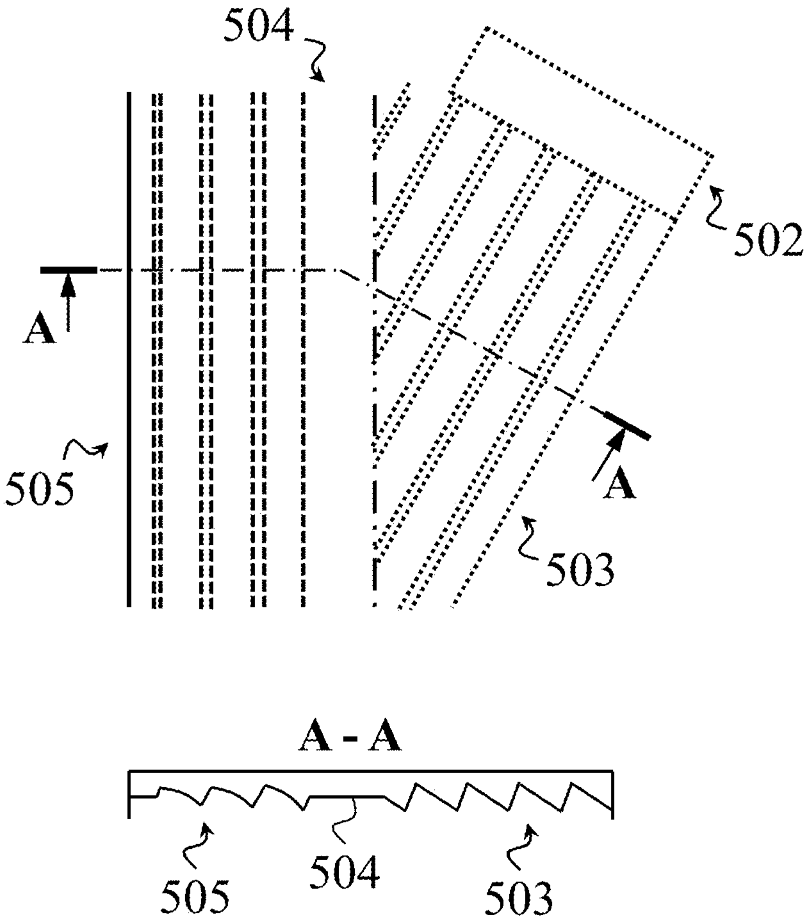
FIG. 7 schematically illustrates a simplified cross-sectional view of the array of extraction microstructures and of the array of bidimensional pupil-multiplication microstructures.

In a step 904, the first piece manufactured at the step 901 and the second piece manufactured at the step 902 are glued together, the microstructures on the surface of the first piece being glued opposite their complementary microstructures on the surface of the second piece, as illustrated on FIG. 7. The refractive indices of the materials used for manufacturing the first piece and the second piece, and of the glue that assembles them, are substantially equal in order to ensure optical continuity. After assembly of the first piece and of the second piece, the optical guide therefore has two planar external surfaces (faces) parallel to each other.

Next, an optical device can be manufactured by adding a collimation device to the optical guide in a step 906. An assembly of the optical guide and of the collimation device is thus implemented, so that the collimation device injects a virtual image, in the form of a beam collimated to infinity, through an injection zone of the optical guide, and so that this image is transported in the optical guide by successive total internal reflections.

The assembly of the optical guide and of the collimation device can then be integrated, with a light image source, in an augmented reality device, such as informative spectacles.

The invention claimed is:

1. An optical guide comprising a first piece made from a transparent material, the first piece comprising on a surface an array of extraction microstructures composed of a succession of extraction microstructures arranged for projecting to a finite distance D a virtual image injected into the optical guide, each extraction microstructure having a prismatic shape with two faces, one face being referred to as an active surface and having a semi-reflective coating for extracting the virtual image from the optical guide and the other face being referred to as a passive surface and not having any semi-reflective coating, wherein each active surface is spherical and has an inclination smaller by a mean angle θ than any active surface immediately previous in the succession of microstructures in a direction of propagation of the virtual image in the optical guide, wherein:

$$\theta=\arctan(P/D)/(2*n)$$

and each active surface has a radius of curvature R such that:

$$R=2*n*D$$

where P is a repetition period of the microstructures of the array of extraction microstructures and n is a refractive index of the transparent material.

2. The optical guide according to claim 1, further comprising a second piece, referred to as a cover piece, made from the same transparent material as the first piece, the second piece comprising microstructures arranged for fitting in spaces between the microstructures of the first piece, the second piece being glued to the first piece so as to form an optical guide with two parallel faces.

3. The optical guide according to claim 2, wherein the second piece has on surface microstructures with shapes complementary to those of the microstructures of the first piece, with a substantially constant thickness of glue.

4. The optical guide according to claim 2, wherein the second piece has on surface microstructures forming another array of extraction microstructures which comprises another succession of extraction microstructures having active surfaces having a semi-reflective coating and arranged to project the virtual image to a distance D' other than the distance D.

5. The optical guide according to claim 4, wherein the distance D' is finite and each active surface of the microstructures of this other array of extraction microstructures is spherical and has an inclination smaller by a mean angle θ' than any active surface immediately preceding in the succession of microstructures in the direction of propagation of the virtual image in the optical guide.

6. The optical guide according to claim 4, wherein the distance D' is infinite.

7. The optical guide according to claim 4, wherein:

the semi-reflective coating on the active surfaces of the first piece is sensitive to a specific polarisation and the semi-reflective coating of the active surfaces of the second piece is sensitive to another specific polarisation; or the semi-reflective coating on the active surfaces of the first piece is sensitive to a specific wavelength and the semi-reflective coating on the active surfaces of the second piece is sensitive to another specific wavelength; or the semi-reflective coating on the active surfaces of the first piece is sensitive to a specific spectral band and the semi-reflective coating on the active surfaces of the second piece is sensitive to another specific spectral band.

8. An image-projection device comprising an optical guide according to claim 1, and a collimation device providing a virtual image collimated to infinity, the collimation device and the optical guide being assembled so that the virtual image supplied by the collimation device is injected into the optical guide and projected to the distance D by the array of extraction microstructures.

9. An augmented reality system comprising at least one image-projection device according to claim 8.

10. A manufacturing method for manufacturing an optical guide, comprising:

manufacturing a first piece from a transparent material, the first piece comprising on a surface an array of extraction microstructures composed of a succession of extraction microstructures arranged for projecting to a finite distance D a virtual image injected into the optical guide, each extraction microstructure having a prismatic shape with two faces, one face being referred to as an active surface for extracting the virtual image from the optical guide and the other face being referred to as a passive surface, each active surface being spherical and having an inclination smaller by a mean angle θ than any active surface immediately preceding in the succession of microstructures in a direction of propagation of the virtual image in the optical guide; and applying a semi-reflective treatment to the active surfaces, excluding the passive surfaces, wherein the manufacturing method is such that:

$$\theta=\arctan(P/D)/(2*n)$$

and each active surface has a radius of curvature R such that:

$$R=2*n*D$$

where P is a repetition period of the microstructures of the array of extraction microstructures and n is a refractive index of the transparent material.

11. The manufacturing method according to claim 10, wherein the first piece further comprises on the surface an array of bidimensional pupil-multiplication microstructures placed between an injection zone through which the virtual image to be projected is injected into the optical guide and the array of extraction microstructures, the bidimensional pupil-multiplication microstructures comprising active surfaces in the form of inclined planes and the other surfaces being passive surfaces, the bidimensional pupil-multiplication microstructures being placed obliquely with respect to the extraction microstructures so as to reflect a light ray of the transported virtual image that strikes one or more of its active surfaces towards the array of extraction microstructures;

and the method further comprises:

applying a semi-reflective treatment to the active surfaces of the bidimensional pupil-multiplication microstructures, excluding the passive surfaces.

12. The manufacturing method according to claim 10, further comprising:

manufacturing a second piece, referred to as a cover piece, from the same transparent material as the first piece, the second piece comprising microstructures arranged for fitting in spaces between the microstructures of the first piece; and gluing the first piece and the second piece together so as to form an optical guide with two parallel faces.

* * * * *